United States Patent
Kalinin et al.

(10) Patent No.: US 12,504,379 B2
(45) Date of Patent: Dec. 23, 2025

(54) METHOD FOR CORRECTING BACKGROUND SIGNALS IN CAPTURED MEASUREMENT VALUES OF ANALOG DETECTORS

(71) Applicant: Carl Zeiss Microscopy GmbH, Jena (DE)

(72) Inventors: Stanislav Kalinin, Jena (DE); Dieter Huhse, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 222 days.

(21) Appl. No.: 18/452,060

(22) Filed: Aug. 18, 2023

(65) Prior Publication Data

US 2024/0060898 A1   Feb. 22, 2024

(30) Foreign Application Priority Data

Aug. 19, 2022 (DE) .................... 10 2022 208 627.9

(51) Int. Cl.
*G01N 21/64* (2006.01)
*G02B 21/16* (2006.01)

(52) U.S. Cl.
CPC ......... *G01N 21/6486* (2013.01); *G02B 21/16* (2013.01); *G01N 2201/121* (2013.01)

(58) Field of Classification Search
CPC ......... G01N 21/6486; G01N 2201/121; G02B 21/16
See application file for complete search history.

(56) References Cited

U.S. PATENT DOCUMENTS

| | | | | |
|---|---|---|---|---|
| 6,188,473 B1* | 2/2001 | Leistner | .................... | G01J 1/44 356/213 |
| 2021/0132192 A1* | 5/2021 | Kimura | ................. | G01S 7/4873 |

(Continued)

FOREIGN PATENT DOCUMENTS

| | | |
|---|---|---|
| CN | 114062331 | 2/2022 |
| EP | 0 008 874 | 4/1983 |

(Continued)

OTHER PUBLICATIONS

Scipioni et al., "Comprehensive correlation analysis for super-resolution dynamic fingerprinting of cellular compartments using the Zeiss Airyscan detector", Nature Communications, vol. 9, 5120, DOI:10.1038/s41467-018-07513-2, 2018, pp. 1-7.

(Continued)

*Primary Examiner* — Hugh Maupin
(74) *Attorney, Agent, or Firm* — Grüneberg and Myers PLLC

(57) ABSTRACT

A method can be used for correcting background signals in captured measurement values of analog detectors, wherein measurement values of an object captured over a reference time period are analyzed and characteristic values of captured background signals are determined. What is characteristic of this is that a threshold value is determined on the basis of at least one characteristic value and by applying a calculation specification; the threshold value is applied to captured measurement values of an analog detector, and only those measurement values which are greater than the threshold value are used for a subsequent signal evaluation. A microscope for carrying out the method according to the invention is also provided.

16 Claims, 4 Drawing Sheets

(56) References Cited

U.S. PATENT DOCUMENTS

2022/0068597 A1* 3/2022 Yamamoto .............. H01J 37/28
2022/0384671 A1* 12/2022 Antolovic .......... G02B 19/0076

FOREIGN PATENT DOCUMENTS

EP      3 523 674       3/2021
WO      2020/136051     7/2020

OTHER PUBLICATIONS

Slenders et al., "Confocal-based fluorescence fluctuation spectroscopy with a SPAD array detector", Light: Science & Applications, vol. 10, No. 31, 2021, pp. 1-12.

* cited by examiner

METHOD FOR CORRECTING BACKGROUND SIGNALS IN CAPTURED MEASUREMENT VALUES OF ANALOG DETECTORS

CROSS-REFERENCE TO RELATED APPLICATIONS

This application claims priority to German Application No. 102022208627.9 filed on Aug. 19, 2022, the content of which is hereby incorporated by reference in its entirety.

BACKGROUND OF THE INVENTION

Field of the Invention

The invention relates to a method for correcting background signals in captured measurement values of analog detectors such as are used for example in the field of correlation spectroscopy, in particular fluorescence correlation spectroscopy (FCS).

Description of Related Art

There are various causes of background signals or background noise; these causes may be present individually or jointly and interact in a complex way. In this regard, effects such as dark noise, photon noise and readout noise contribute to background noise in varying proportions.

Additional causes for background signals can be an existing dark voltage and/or an existing dark current. In the context of the description of the present invention, the terms background signal and background noise are used synonymously. They refer to signals (dark signals, dark noise) that are essentially caused by a technical system and its properties. A dark signal is to be distinguished from a signal (bright signal) that is caused by the detection of photons. For the purposes of the description, photon noise should therefore not be included in the term dark signal (background signal).

A publication by Scipioni et al. (L. Scipioni, L. Lanzanb, A. Diaspro, and E. Gratton, 2018, Comprehensive correlation analysis for superresolution dynamic fingerprinting of cellular compartments using the Zeiss Airyscan detector; Nature Communications 9:5120) presented a new concept for FCS. This method, referred to as CCA (comprehensive correlation analysis) uses so-called array detectors and allows an advantageous combination of spatial and temporal correlation methods.

In Scipioni et al. (2018), image data are captured using a so-called Airyscan detector formed by a plurality of individual detectors (array) arranged in a plane. In contrast to types of detectors normally used for capturing image data, which very often have significant after-pulsing and also a high level of dark noise (dark count rate), the Airyscan detector operates in analog fashion. The use of digital array detectors has likewise been described recently (E. Slenders, M. Castello, M. Buttafava, F. Villa, A. Tosi, L. Lanzanò S. V. Koho and G Vicidomini, 2021, Confocal-based fluorescence fluctuation spectroscopy with a SPAD array detector; Light: Science & Applications 10:31).

In order then to obtain precise values of the correlations particularly when an analog detector is used, the background noise needs to be taken into account sufficiently. Even if the background noise occurs in an uncorrelated manner, the correlation amplitude is adversely influenced by the background noise. One example of the behavior of functions of the correlation amplitudes for pure counting of captured events (digital) and for analog capture is indicated in FIG. 1. The illustration shows FCS data of Rh123 (rhodamine 123) in water which were captured under identical conditions in the photon counting mode (continuous full line) and in an analog mode without background correction (interrupted full line).

The publication by Scipioni et al. (2018; see above) describes a correction of a dark signal as a component of background noise. This correction proceeds satisfactorily if the available signal-to-noise ratio (SNR) is good. Otherwise, the approach described by Scipioni et al. (2018) has some disadvantages. In this regard, a long time of more than 20 seconds (10 million time units each of 2.46 µs) is required in order to collect data of a dark signal that occurs. For the user this means carrying out a further work step. Moreover, additional storage capacities and longer processing times are required. In addition, with regard to background fluctuations that occur, the proposed procedure is not sufficiently stable particularly if low signal strengths are present. This may be the case for example if few and/or dark particles are present in the excitation volume. From the formula specified by Scipioni et al. (2018; see page 3 therein), it is possible to deduce that even small fluctuations of the dark signal have considerable effects on the autocorrelation function $G(\tau)$. This effect is additionally intensified if an array detector, for example an Airyscan detector, is used, since each individual detector of the array acquires only a small portion of the total signal captured.

SUMMARY OF THE INVENTION

The invention is based on the object of proposing a possibility for correcting background noise by means of which disadvantages of the prior art are reduced.

The object is achieved by a method for correcting background signals in captured measurement values of analog detectors as described below Advantageous developments are also described below.

When carrying out the method, measurement values of an object captured over a reference time period are analyzed and characteristic values of captured background signals are determined. Characteristic values are for example mean values and/or dispersion measures such as the standard deviation or variance of the captured measurement values. In this case, an object can be a sample to be captured. An object can be in particular a biological sample comprising molecules that are excitable to emit fluorescent radiation (fluorophores and/or molecules capable of autofluorescence). It is also possible for a capturing optical unit to be directed into a sample space in which no object is currently present, but the other parameters set during image data capture are present, such as temperature, configuration of a detection optical unit and/or the incidence of ambient light.

The invention also includes the following embodiments:
1. A method for correcting background signals in captured measurement values of analog detectors (3),
   wherein
   measurement values of an object (O) captured over a reference time period are analyzed and characteristic values of captured background signals are determined,
   wherein
   a threshold value (Sw) is determined on the basis of at least one of the characteristic values and by applying a calculation specification;
   the threshold value (Sw) is applied to captured measurement values of an analog detector (3), and only those measurement values which are greater than or equal to the threshold value (Sw) are used for a subsequent signal evaluation.

2. The method of embodiment 1, wherein the measurement values captured over the reference time period are converted into a digitized form and the characteristic values used for determining the threshold value (Sw) are determined on the basis of the digitized measurement values.

3. The method of embodiment 1 or 2, wherein either
   all captured measurement values which are less than the threshold value (Sw) are set to a value of zero; or
   the threshold value (Sw) is subtracted from all captured measurement values and all negative subtraction results are set to a value of zero.

4. The method of embodiment 1, wherein the mean value of captured background signals and a multiple of its standard deviation are used as characteristic values.

5. The method of embodiment 4, wherein the calculation specification: Sw=mean value of the captured measurement values of the background signals+n (standard deviation of the captured measurement values of the background signals); is used, where n is a real number and selected from a range n≥2 to ≥6.

6. The method of any of the preceding embodiments, wherein dark signals of the detector (3) are captured as background signals.

7. The method of any of the preceding embodiments, wherein a multichannel detector is used as analog detector (3) and a correction of the background signals is performed individually for each of the channels or detector elements (3.m).

8. The method of any of the preceding embodiments, wherein an electrical voltage of the detector (3) or of the respective detector elements (3.m) is varied until an optimized coordination with an operating range of an analog-to-digital converter (5) connected downstream of the detector (3) is attained.

9. The method of any of the preceding embodiments, wherein data sets comprising measurement values which are greater than zero, and measurement values which were set to zero, are compressed by means of a data compression method.

10. A microscope M, comprising a detection beam path D for guiding radiation 2 to be captured, having optical elements 1 for guiding and shaping the radiation 2 and also for directing the radiation 2 to be captured onto detector elements 3.m of an analog detector 3, in particular of an array detector 3, and also an analog-to-digital converter 4 and an evaluation unit 5, wherein captured measurement values of the detector 3 are communicated as electrical signals to the analog-to-digital converter 4 and the measurement values digitized by means of the analog-to-digital converter 4 are transmitted to the evaluation unit 5, wherein the evaluation unit 5 is configured for carrying out the method of any of embodiments 1 to 9.

DETAILED DESCRIPTION OF THE INVENTION

What is characteristic of a method according to the invention is that a threshold value is determined on the basis of at least one characteristic value and by applying a calculation specification. Said threshold value is applied to captured measurement values of an analog detector. Only those measurement values which are greater than or equal to the threshold value are used for a subsequent signal evaluation, i.e. the evaluation of captured measurement values.

In one advantageous embodiment of the method according to the invention, the measurement values captured over the reference time period are preferably converted into a digitized form. The digitized measurement values constitute the database on which the characteristic values used for ascertaining the threshold value are determined.

In order that a suitable resolution of the digitized measurement values can be made available for the method according to the invention, the bit depth of an analog-to-digital converter used for converting the analog signal into digital measurement values is at least 12 bits, but advantageously at least 16 bits.

Figure 2:
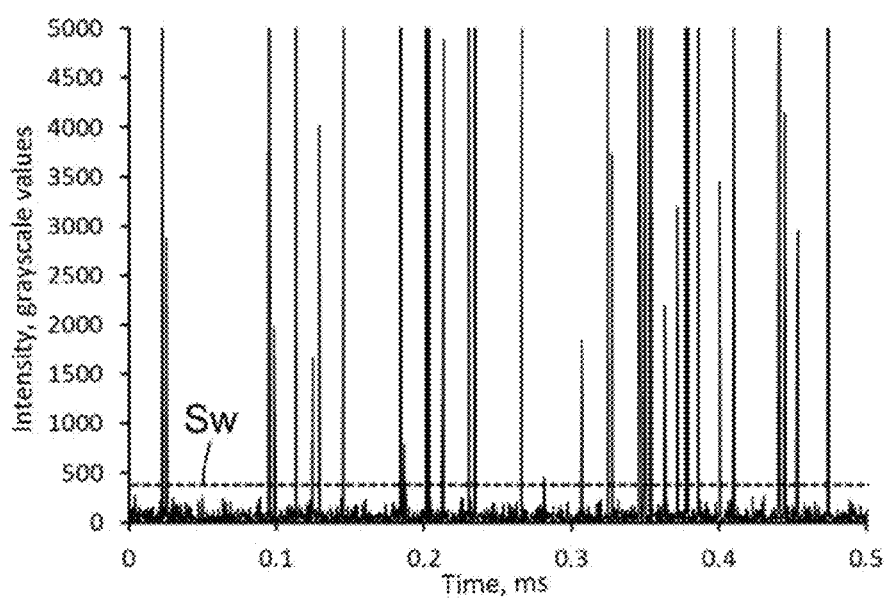
FIG. 2 shows an example of typical manifestation of FCS measurement values captured in analog form and digitized.

If consideration is given to a typical manifestation of FCS measurement values captured in analog form and digitized, as is shown by way of example in FIG. 2, it is possible to distinguish clearly individual measurement values with high intensity values which occur owing to the capture of at least one photon. In addition, albeit at a distinctly lower intensity level, a large number of intensity values that are regarded as background noise can be discerned.

It has been recognized that, with no loss of information, a threshold value Sw of the intensity can be defined above which a captured signal is assessed as emanating from the object, while measurement values below the threshold value Sw are assigned to the background noise and are optionally not taken into account any further in a further signal evaluation.

Figure 3:
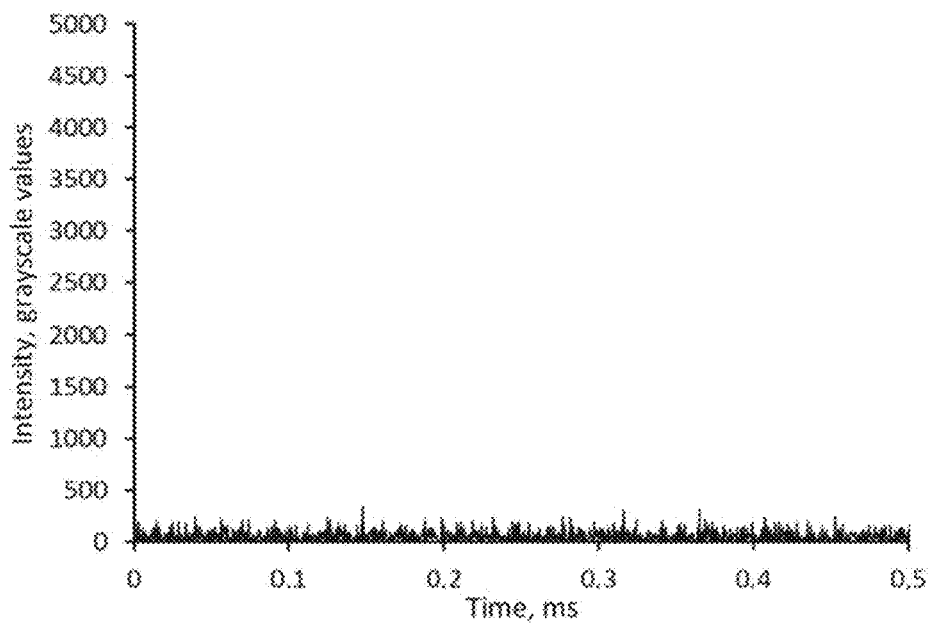
FIG. 3 shows an example of background noise captured during a reference time period.

The background signals are captured during the reference time period, over the duration of which illumination of the object with excitation radiation is advantageously interrupted. Therefore, only the background noise is captured during the reference time period (FIG. 3). By way of example, a laser light source such as is used for the excitation of fluorophores present in the object is switched off or stopped down over the duration of the reference time period. Additionally or alternatively, capture of signals emanating from the object can be interrupted, for example by a detection beam path present being stopped down or closed. Characteristic values of the measurement values which are captured in the reference time period and are preferably digitized are determined and the threshold value is derived therefrom and stored.

The reference time period can advantageously be chosen to be very short and can be 100 ms, for example. By comparison with the prior art, a duration for capturing the background noise that is shorter by more than two orders of magnitude (>factor 100) is thus sufficient.

Once the threshold value has been determined, it can then be applied to measurement values which are captured for example from an object which is illuminated with excitation radiation. The measurement values captured during the reference time period can be discarded. Optionally, the characteristic values on which the threshold value is based are stored in order to make the further signal evaluation open to scrutiny.

In order that those measurement values which are less than the threshold value determined are removed from the data set to be evaluated, they can be set to a value of zero. Alternatively, the threshold value can be subtracted from all captured measurement values. A value of zero is allocated to all negative subtraction results obtained in the process. The latter procedure can be implemented in a technically simple manner.

The results of the two procedures are comparable. In the case of typical background noise, grayscale values of less than 100 occur for example given a 16-bit resolution. By contrast, the intensity values of captured photons is approximately 5000. That is to say that a reduction of these intensity values by 100, for example, is hardly relevant.

Figure 4:
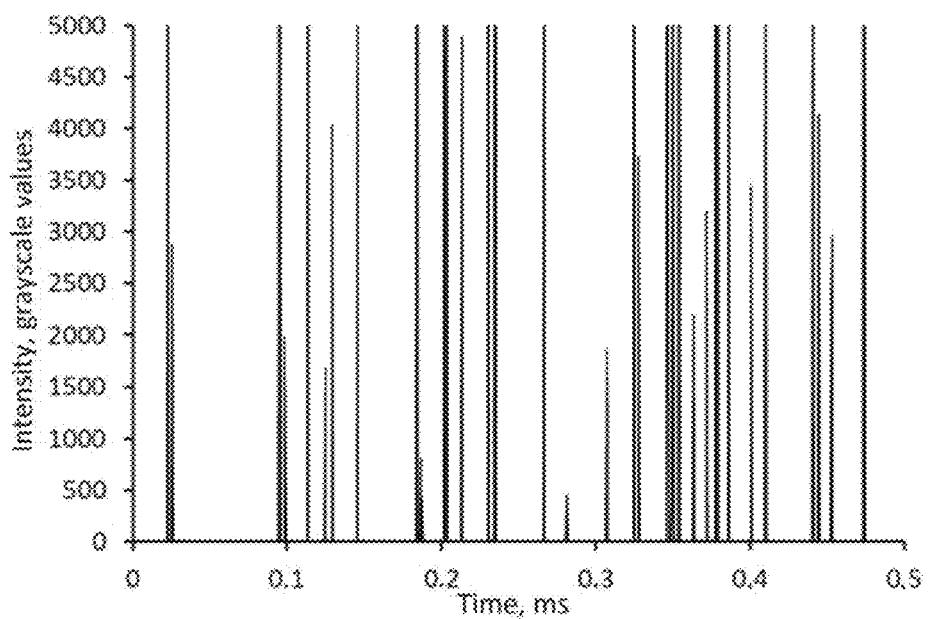
FIG. 4 shows an example of remaining measurement values which can be subjected to an evaluation.

After the measurement values of the object that are below the threshold value Sw have been excluded from the further signal evaluation, the remaining measurement values (FIG. 4) can be subjected to an evaluation, in particular a correlation analysis, without further corrections.

Owing to the correction of the background signals according to the invention, a data set of captured measurement values of the object contains very many measurement values set to zero, besides a few captured photons. In order to utilize storage capacities effectively and in order to facilitate data processing, the data sets can be compressed by means of data compression methods in a known manner.

In one preferred embodiment of the method according to the invention, the mean value of captured background signals and a multiple of its standard deviation are used as characteristic values. It has proved to be advantageous, for example, for the standard deviation determined to be multiplied by a factor of at least 2, advantageously 4 or 5, in particular by a factor of 6 or more, and to be added to the mean value (calculation specification). The calculation specification can be specified for example as threshold value Sw=mean value+n×standard deviation, with n selected from a range n≥2 to ≥6, where n is a real number. What is achieved in this way is that even in the case of distinctly fluctuating measurement values, a threshold value is found which enables reliable separation of background noise and capture of photons. The characteristic values are advantageously calculated on the basis of the digitized measurement values. Direct use of the analog data is possible, but more complex.

As already discussed above, the term background noise is understood to mean effects of a plurality of physical influences. In one embodiment of the method according to the invention, it is possible to capture only dark signals of the detector as background signals. For this purpose, the sample space can be darkened or a beam path upstream of the detector can be closed, such that measurement values that occur are brought about only owing to the dark current of the detector.

The invention advantageously affords a possibility of being able to define a threshold value in a transparent, in particular standardized, manner by taking account of the properties of the respective measurement values. Standardization is advantageous particularly in regard to the comparability and publishability of the results.

Figure 8:
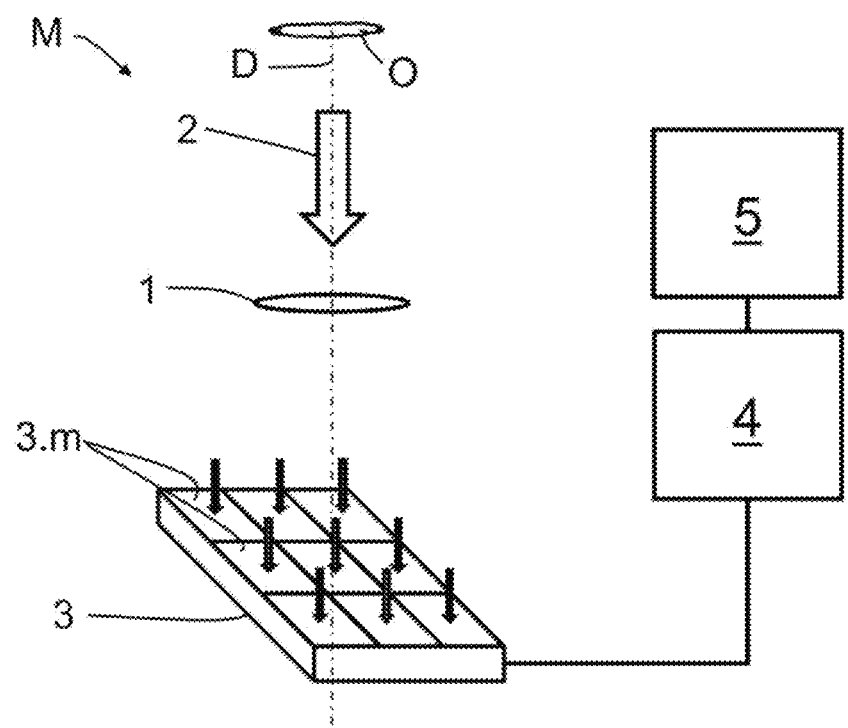
FIG. 8 shows an example of an arrangement of a microscope M.

The method according to the invention can be applied to individual analog detectors or to individual channels of a detector. If a detector array operating in analog fashion or a multichannel detector (see FIG. 8, for example) such as the Airyscan detector is used, a correction of the background signals can advantageously be performed individually for each of the channels. In the case of the multichannel detector, an individual correction of the background signals can be effected for each of the individual detectors (=channels) present.

In order to counteract undesired discarding of signals of captured photons, settings and operating parameters of the detector used can be adapted. By way of example, an electrical voltage at the detector element of a detector can be varied until an optimized coordination with an operating range of an analog-to-digital converter (ADC) connected downstream of the detector is attained. In particular, a configuration can be sought in which captured photons lead to signals that are as pronounced as possible and the highest possible measurement values, but a dynamic range of the analog-to-digital converter is not left. Such an optimization can also be performed for each individual channel of a detector or for each detector element of an array. In this case, an algorithm can be applied which systematically varies the respective voltages and compares the effects respectively attained in the process with a predefined target value or with a predefined target value range. Once an optimized voltage value has been found, the detector or the detector element is operated with this voltage value. A renewed optimization can be initiated manually or in an automated manner.

Figure 1:
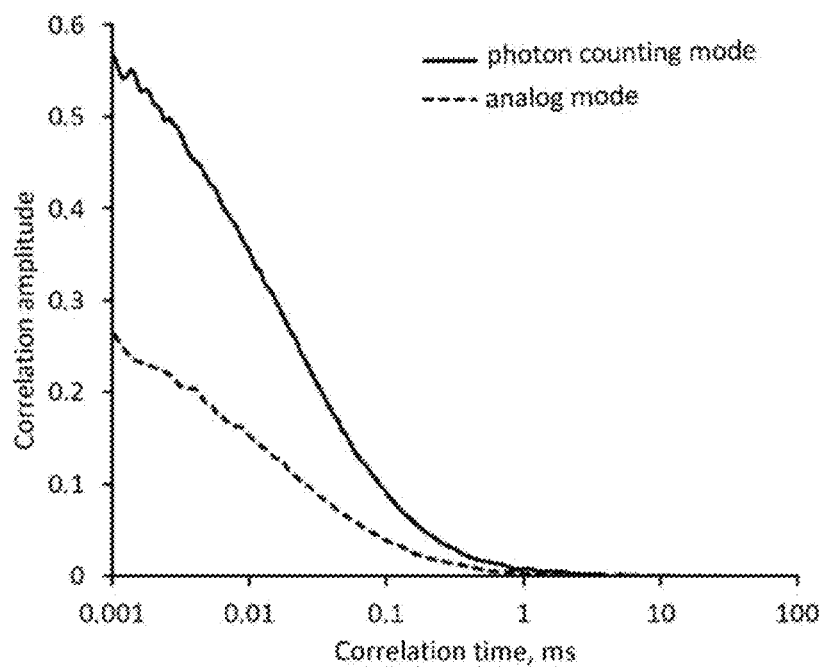
FIG. 1 shows an example of the behavior of functions of the correlation amplitudes for pure counting of captured events (digital) and for analog capture.
Figure 5:
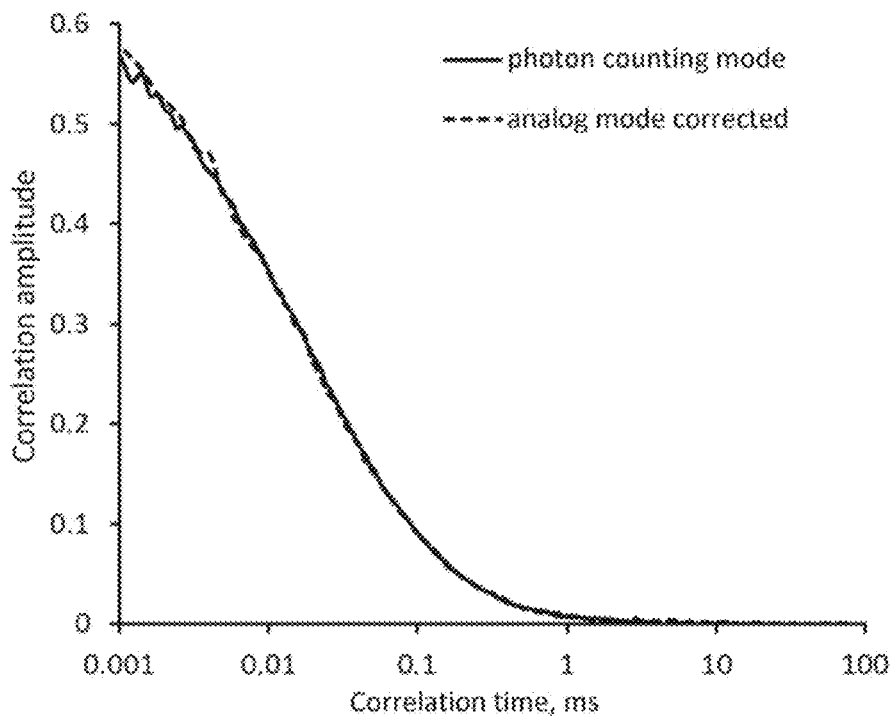
FIG. 5 shows an example of the function of the correlation amplitudes of measurement, where the background noise was corrected by the method according to the invention.
Figure 6:
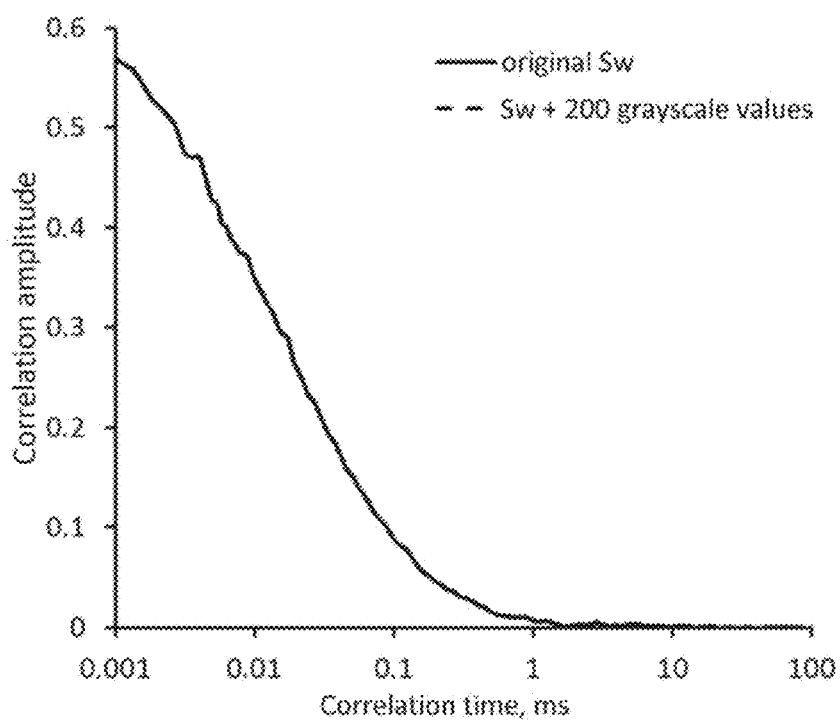
FIG. 6 shows an example which illustrates that a threshold value Sw increased by 200 grayscale values, leads to a function of the correlation amplitude which is almost congruent with the initial function of the original threshold value.
Figure 7:
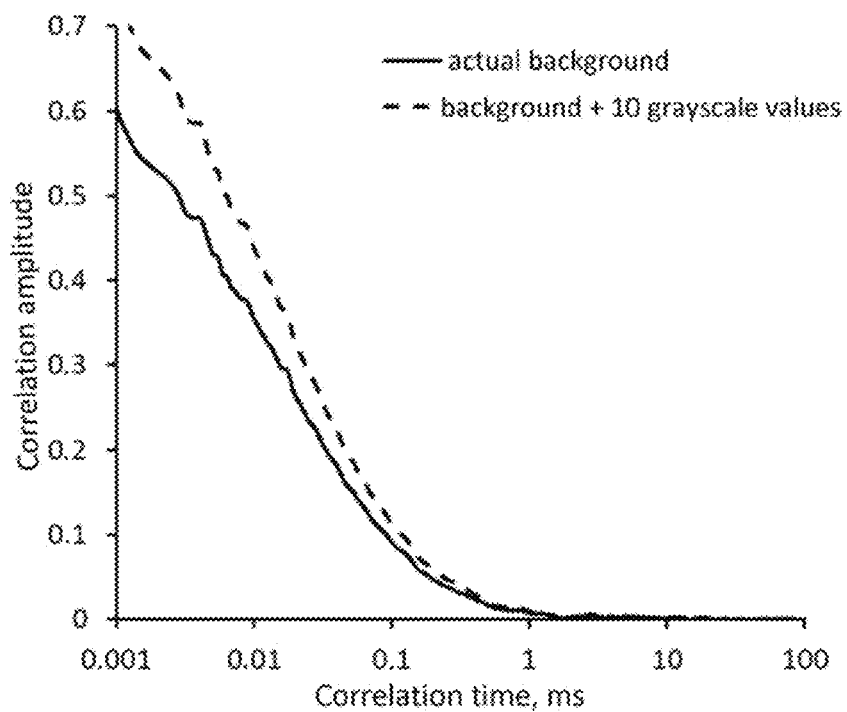
FIG. 7 shows an example of an increase in the background noise by just 10 grayscale values, which leads to distinct deviations between the functions.

Effects of the method according to the invention are illustrated by way of example below in FIGS. 5 to 7 on the basis of FCS data of Rh123 in water. The data shown concerning FIG. 1 are plotted once again in FIG. 5 (full line, "photon counting mode"). The function of the correlation amplitudes of measurement values is additionally shown (interrupted full line; "analog mode corrected"), the background noise of which was corrected by means of the method according to the invention by the definition of the threshold value as Sw=mean value+6× standard deviation. No significant or systematic deviations of both functions can be established.

It was found, moreover, that the method according to the invention is largely insensitive vis-à-vis the threshold value Sw. FIG. 6 illustrates that a threshold value Sw increased by 200 grayscale values, by way of example, leads to a function of the correlation amplitude which is almost congruent with the initial function of the original threshold value.

By contrast, in the case of the correction method proposed by Scipioni et al. (2018), an increase in the background noise by just 10 grayscale values already leads to distinct deviations between the functions (FIG. 7).

A detection beam path D—serving to guide radiation 2 to be captured—of an arrangement (FIG. 8), in particular of a microscope M, for FCS measurement comprises optical elements 1 (merely illustrated symbolically) which have the effect that the radiation 2 that comes from an object O and is to be captured is guided, is shaped and is directed or can be directed onto detector elements 3.*m* of an analog detector 3, in particular of an array detector 3. Captured measurement values of the detector 3 are communicated as electrical signals to an analog-to-digital converter 4. The measured values digitized by means of the analog-to-digital converter 4 are transmitted to an evaluation unit 5 configured for carrying out the method according to the invention. The evaluation unit 5 in this sense serves as a filter of the captured measurement values. The measurement values with the corrected background noise can be stored and/or provided for further evaluation and processing.

REFERENCE SIGNS

1 Optical element
2 Radiation
3 Detector
3.*m* Detector element; where m=1, 2, . . . , n
4 Analog-to-digital converter
5 Evaluation unit
M Microscope
D Detection beam path
O Object

The invention claimed is:

1. A method for operating a fluorescence microscope to correct background signals in captured measurement values of an analog detector, the method comprising:
   guiding radiation emitted from a sample under fluorescence excitation along a detection beam path through optical elements configured to guide and shape the emitted radiation and to direct the emitted radiation onto detector elements of the analog detector;
   receiving, by an analog-to-digital converter, electrical signals corresponding to measurement values captured by the analog detector and digitizing the measurement values: and
   receiving, by an evaluation unit, the digitized measurement values from the analog-to-digital converter:
   analyzing, by the evaluation unit, measurement values of an object captured over a reference time period during the fluorescence microscopy measurement;
   determining, by the evaluation unit, characteristic values of captured background signals;
   detecting and correcting, by the evaluation unit dark signals of the analog detector from the background signals, the dark signals comprising output signals of the detector generated in absence of incident photons under the fluorescence excitation;
   determining, by the evaluation unit, a threshold value based on of at least one of the characteristic values and by applying a calculation specification;
   applying, by the evaluation unit, the threshold value to captured measurement values of the analog detector; and
   filtering, by the evaluation unit, the captured measurement values such that only those measurement values which are greater than or equal to the threshold value are used for a subsequent signal evaluation,
   wherein the analog detector is an array detector, and
   wherein during the fluorescence microscopy measurement, the detection and correction of dark signals by the evaluation unit is performed separately for each detector element of the array detector for fluorescence correlation spectroscopy analysis.

2. The method as claimed in claim 1, wherein the measurement values captured over the reference time period are converted into a digitized form and the characteristic values used for determining the threshold value are determined based on the digitized measurement values.

3. The method as claimed in claim 1, wherein either
   all captured measurement values which are less than the threshold value are set to a value of zero; or
   the threshold value is subtracted from all captured measurement values and all negative subtraction results are set to a value of zero.

4. The method as claimed in claim 1, wherein a mean value of captured background signals and a multiple of its standard deviation are used as the characteristic values.

5. The method as claimed in claim 4, wherein a calculation specification is used:
   threshold value=mean value of the captured measurement values of the background signals+n (standard deviation of the captured measurement values of the background signals);
   wherein n is a real number and selected from a range $n \geq 2$ to $\leq 6$.

6. The method as claimed in claim 1, wherein the array detector is a multichannel detector is used as the analog detector, and a correction of the background signals is performed individually for each of the channels or detector elements.

7. The method as claimed in claim 1, wherein an electrical voltage of the analog detector or of respective detector elements is varied until an optimized coordination with an operating range of an analog-to-digital converter connected downstream of the analog detector is attained.

8. The method as claimed in claim 1, wherein data sets comprising measurement values which are greater than zero, and measurement values which were set to zero, are compressed by a data compression method.

9. A fluorescence microscope, comprising:
   a detection beam path for guiding radiation emitted from a sample under fluorescence excitation, having optical elements for guiding and shaping the emitted radiation and for directing the emitted radiation onto detector elements of an analog detector;
   an analog-to-digital converter configured to receive electrical signals corresponding to measurement values captured by the analog detector and to digitize the measurement values; and
   an evaluation unit configured to:
   receive the digitized measurement values from the analog-to-digital converter;
   analyze measurement values of an object captured over a reference time period during a fluorescence microscopy measurement:
   determine characteristic values of captured background signals;
   detect and correct dark signals of the analog detector from the background signals, the dark signals comprising output signals of the detector generated in absence of incident photons under the fluorescence excitation:
   determine a threshold value based on at least one of the characteristic values and by applying a calculation specification:
   apply the threshold value to captured measurement values of the analog detector; and
   filter the captured measurement values such that only those measurement values which are greater than or equal to the threshold value are used for a subsequent sional evaluation,
   wherein the analog detector is an array detector and
   wherein during the fluorescence microscopy measurement, the evaluation unit is configured to perform the detection and correction of dark signals separately for each detector element of the array detector for fluorescence correlation spectroscopy analysis.

10. The fluorescence microscope as claimed in claim 9, wherein the measurement values captured over the reference time period are converted into a digitized form by the analog-to-digital converter and the characteristic values used for determining the threshold value are determined based on the digitized measurement values.

11. The fluorescence microscope as claimed in claim 9, wherein the evaluation unit is configured such that either
all captured measurement values which are less than the threshold value are set to a value of zero; or
the threshold value is subtracted from all captured measurement values and all negative subtraction results are set to a value of zero.

12. The fluorescence microscope as claimed in claim 9, wherein the evaluation unit is configured to use a mean value of captured background signals and a multiple of its standard deviation as the characteristic values.

13. The fluorescence microscope as claimed in claim 9, wherein the evaluation unit is configured to apply a calculation specification:

threshold value=mean value of the captured measurement values of the background signals+n (standard deviation of the captured measurement values of the background signals);
wherein n is a real number and selected from a range $n \geq 2$ to $\leq 6$.

14. The fluorescence microscope as claimed in claim 9, wherein the array detector is a multichannel detector, and the evaluation unit is configured to perform a correction of the background signals individually for each of the channels or detector elements.

15. The fluorescence microscope as claimed in claim 9, wherein an electrical voltage of the analog detector or of respective detector elements is varied until an optimized coordination with an operating range of the analog-to-digital converter is attained.

16. The fluorescence microscope as claimed in claim 9, wherein the evaluation unit is configured to compress data sets comprising measurement values which are greater than zero, and measurement values which were set to zero, by a data compression method.

\* \* \* \* \*